United States Patent Office 3,340,015
Patented Sept. 5, 1967

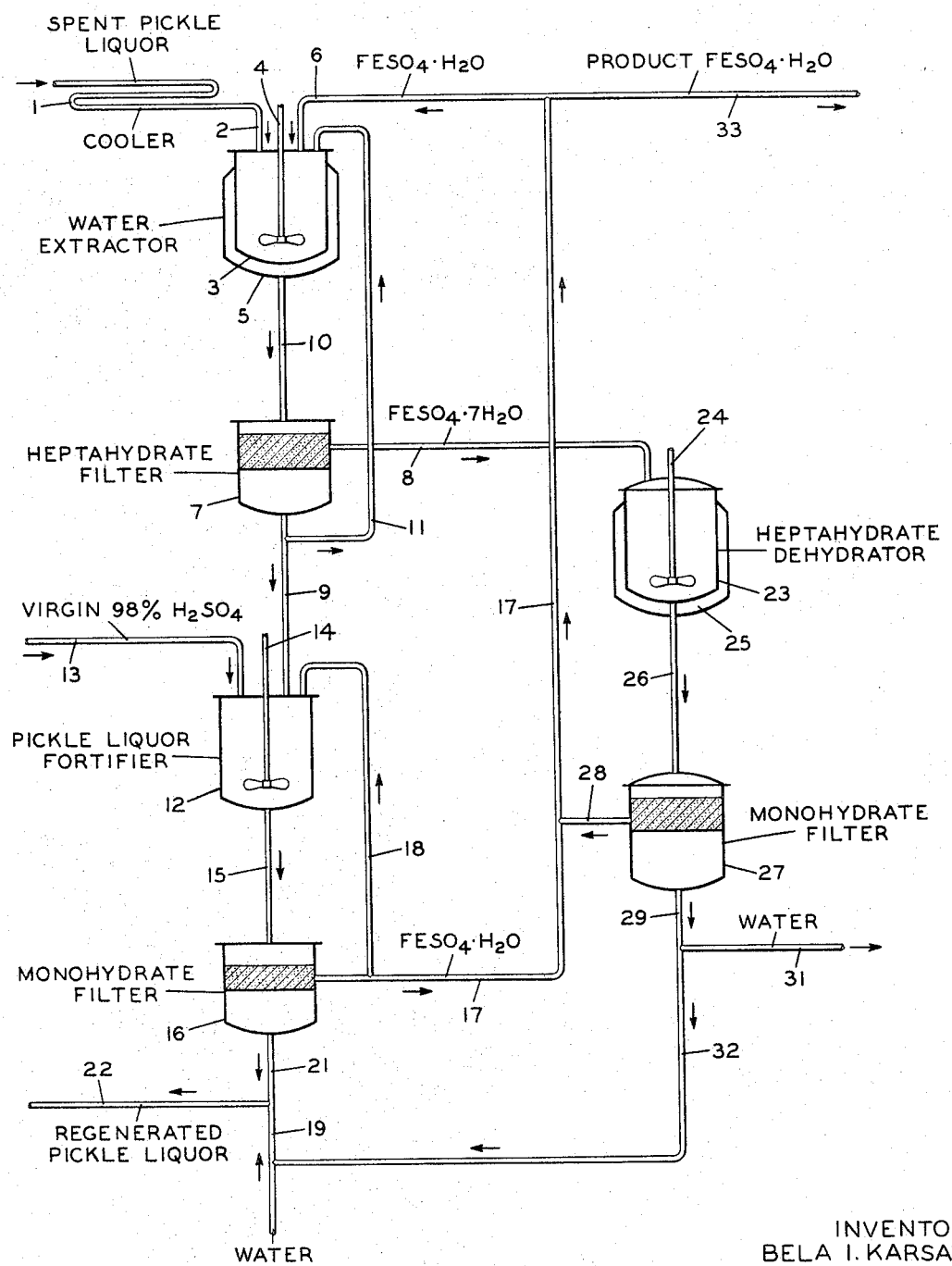

3,340,015
PICKLE LIQUOR
Bela I. Karsay, East Orange, N.J., assignor to Allied Chemical Corporation, New York, N.Y., a corporation of New York
Filed June 11, 1964, Ser. No. 374,527
7 Claims. (Cl. 23—293)

This invention relates to pickle liquor and more particularly refers to a new and improved process for regeneration of spent pickle liquor by concentrating and purifying the contained sulfuric acid.

Spent pickle liquor is a waste material of the pickling operation of steel mills. Pickling is a treatment of iron and steel strips, sheets, etc. with aqueous sulfuric acid solutions to remove the scale from their surfaces. The sulfuric acid interacts with the iron oxide during the pickling, and forms water soluble ferrous sulfate with it. The effectiveness of the sulfuric acid solution gradually diminishes as its acid content decreases and its $FeSO_4$ content increases. It is usually withdrawn from the pickling operation and is discarded when ½–⅔ of the acid is converted to $FeSO_4$. The disposal of large amounts of pickle liquor not only represents a serious loss in unreacted sulfuric acid, but causes an objectionable pollution problem, even after neutralization.

A variety of methods have been proposed to eliminate the pollution problem by effecting recovery of the acid values from spent pickle liquor. Some of the proposed methods regenerate pickle liquor by the evaporation of water, at atmospheric or subatmospheric pressure, and by precipitation of ferrous sulfate. Another method removes water from the spent pickle liquor by the precipitation of ice and ferrous sulfate crystals at sub-zero (° C.) temperatures. Still another process offers an ion exchange method for the extraction of the iron content of the spent acid with subsequent evaporation of water, etc. Unfortunately these methods in practice are either too costly or impractical.

An object of the present invention is to provide a novel process for the regeneration of spent pickle liquor in which both the free and the combined sulfuric acid may be recovered.

Another object of the invention is to provide an economical method for the removal of water and ferrous sulfate from the spent pickle liquor in which the costly techniques of evaporation or freezing are avoided.

A further object of the invention is to provide a pickle liquor recovery process in which corrosion problems are reduced to a minmium by operating at or close to ambient temperature in regeneration steps where free sulfuric acid is handled.

Other objects and advantages will be apparent from the following description and accompanying drawing.

In accordance with the present invention spent pickle liquor comprising an aqueous solution of ferrous sulfate and sulfuric acid is regenerated for use in pickling by concentrating the sulfuric acid contained in the spent pickle liquor and separating ferrous sulfate therefrom, by adding crystalline ferrous sulfate monohydrate to the spent pickle liquor in a quantity which is substantially larger than corresponds to its solubility in the spent pickle liquor i.e. a quantity of ferrous sulfate monohydrate such that the resultant slurry will contain 20–50%, preferably 25–35% by weight ferrous sulfate based on the total weight of slurry, maintaining the temperature of the slurry within the range of 130° F. to the freezing point of the slurry preferably within the range of 50–0° F. for a sufficient length of time for the ferrous sulfate monohydrate to extract water from the spent pickle liquor and combine with it to form ferrous sulfate heptahydrate and simultaneously with the concentrating of the sulfuric acid in the pickle liquor as a result of the extraction of water therefrom, solubility of ferrous sulfate in the pickle liquor decreases with the result that the ferrous sulfate heptahydrate precipitate in the slurry is greater in quantity based on the ferrous sulfate than the amount of ferrous sulfate monohydrate added to the spent pickle liquor. The ferrous sulfate heptahydrate crystals are separated from the liquid leaving a more concentrated pickle liquor, i.e. a stronger sulfuric acid solution than is initially present.

The recovered heptahydrate may be reconverted to monohydrate by dehydration and recycled to the water extraction step for the regeneration of a new amount of pickle liquor. Thus, the process is self-sustaining, as after the initial start up, it furnishes its own water extracting agent, and no ferrous sulfate monohydrate is required from external sources to maintain the operation. Moreover, an excess of ferrous sulfate monohydrate is produced, equivalent to the amount which precipitates out of the pickle liquor or concentration. This material may be withdrawn from the process and utilized in the sulfuric acid manufacture. The concentration of the sulfuric acid in the pickle liquor may be increased to about 25–35% by water extraction with ferrous sulfate monohydrate.

A further concentration of the acid to the desired final strength may be accomplished by fortification with a concentrated sulfuric acid e.g. 66° Bé sulfuric acid, which at the same time, supplies the make-up acid. On addition of the 66° Bé acid, additional ferrous sulfate precipitates out of the pickle liquor, because the solubility of the salt further decreases with increasing acid strength. However, this portion of the recovered total ferrous sulfate is monohydrate in contrast to the first portion, which was heptahydrate, and may directly be, after separation from the liquid, recycled to the water extraction step. The filtrate of this second separation is the regenerated pickle liquor, which, after dilution to the proper strength with water, may be returned to the pickling operation.

A major portion of the ferrous sulfate originally present in the spent pickle liquor is precipitated out as heptahydrate in the water extraction step, while a smaller portion crystallizes out as monohydrate upon addition of the make-up acid. Of the two hydrates of ferrous sulfate, the monohydrate is the preferred form, because it is needed in the pickle liquor regeneration process as a water extracting agent, and because it can more economically be used in sulfuric acid plants as a raw material. Therefore, in the subsequent steps of the process the recovered ferrous sulfate heptahydrate is converted to the monohydrate by dehydration. The dehydration of the heptahydrate may readily be accomplished by heating it to a temperature above the transition point of ferrous sulfate heptahydrate to form ferrous sulfate monohydrate to release six mols of crystal water and by separating the monohydrate formed from the released six mols of crystal water. The transition temperature is normally about 153° F. but may vary somewhat dependent upon impurities dissolved in the solution. The separation may be accomplished either by mechanical or by physical means, such as filtration, centrifuging, evaporation, etc. The mechanical separation of the monohydrate from the crystal water, under usual conditions, is inefficient, because a considerable portion of the ferrous sulfate may be lost with the filtrate, and the recovered monohydrate may not be sufficient, without supplement, to cover the monohydrate requirements of this regeneration process.

I have found that practically no ferrous sulfate is lost with the filtrate, and that relatively small amount of heat energy is required, if the dehydration of the heptahydrate, and the separation of the monohydrate from the released crystal water is carried out in the temperature range of 100°–200° C. (212°–392° F.) preferentially between 140° and 170° C. (284° and 338° F.), under a pressure sufficient to keep the water in liquid form. The solubility of ferrous sulfate in water diminishes with increasing temperature and becomes almost zero at about 156° C. (310° F.). In this way a quantitative recovery of the ferrous sulfate monohydrate is possible. This is more than is required as water extracting agent in the process, and the surplus may be withdrawn as a by-product, and may be used for the manufacture of sulfuric acid.

The accompanying drawing diagrammatically illustrates one method of carrying out the present invention.

Waste spent pickle liquor generally derived from steel plants is an aqueous solution of sulfuric acid and ferrous sulfate and varies in composition dependent on local plant conditions. Usually the acid content is within the range of about 5 to 15% and the ferrous sulfate content varies from about 10 to 25%. Referring to the drawing, spent pickle liquor from the plant is generally in a heated condition about 180–200° F. and is therefore passed through cooler 1 where it is cooled by indirect heat exchange with water to a temperature of about 60–80° F. and the cooled spent pickle liquor discharged through line 2 into water extractor 3 which may be any suitable vessel equipped with stirrer 4 and jacket 5 through which a cooling fluid may be passed to maintain the desired temperature within water extractor 3.

Ferrous sulfate monohydrate from an external source or preferably recycled ferrous sulfate monohydrate produced in the process is introduced into water extractor 3 through line 6 in an amount in substantial excess of the quantity which would dissolve in the spent pickle liquor. A major portion of the ferrous sulfate monohydrate remains in solid form suspended in the pickle liquor, and only a small portion is dissolved by it. The amount of ferrous sulfate in the slurry based on the total weight of slurry contained in water extractor 3 should be at least 20% to 50%, preferably 25–35%. The mixture of spent pickle liquor and solid ferrous sulfate monohydrate are agitated by stirrer 4 and maintained until conversion of ferrous sulfate monohydrate to heptahydrate is effected. It is important to maintain the temperature within water extractor 3 below about 130° F. to effect conversion of ferrous sulfate monohydrate to ferrous sulfate heptahydrate and thus extraction of the water from the spent pickle liquor. Lower temperature conditions are more favorable and the temperature within the water extractor 3 may be maintained to just above the freezing point of the contents. As a practical matter the preferred temperature range is between about 50 to 90° F. As the concentration of sulfuric acid in the spent pickle liquor in water extractor 3 increases due to the extracting effect of the monohydrate, the solubility of the ferrous sulfate dissolved in the spent pickle liquor decreases as a result of the increased concentration of sulfuric acid, and ferrous sulfate heptahydrate precipitates out of the pickle liquor in addition to the amount that was formed from the ferrous sulfate monohydrate added to the spent pickle liquor through line 6. Thus the resultant slurry in water extractor 3 after completion of the reaction is a liquor having an appreciably higher sulfuric acid concentration than initially present and having an appreciably lower ferrous sulfate content with dispersed solid ferrous sulfate heptahydrate resulting from externally introduced ferrous sulfate monohydrate and ferrous sulfate precipitated out of the spent pickle liquor.

After the conversion of ferrous sulfate monohydrate to heptahydrate is completed, the reaction mixture is run through line 10 to heptahydrate filter 7 where the acid is separated from the crystals of ferrous sulfate heptahydrate. Separation of the crystals may also be accomplished by centrifuging or other suitable means. The crystals of ferrous sulfate heptahydrate collected on the filter are discharged from filter 7 through line 8. The filtrate containing a more concentrated sulfuric acid usually about 25% $H_2SO_4$ is discharged from the bottom of heptahydrate filter 7 through line 9. A portion of the filtrate may be returned through line 11 to water extractor 3. Recycling of this filtrate to the water extractor facilitates concentration of the sulfuric acid and extraction of ferrous sulfate from the pickle liquor.

In some instances the filtrate discharging through line 9 may be useful as a pickle liquor without further treatment. In a preferred procedure the acid filtrate discharging through line 9 is run to pickle liquor fortifier 12 where make-up concentrated sulfuric acid such as virgin 98% $H_2SO_4$ is added to it through line 13. On addition of the make-up acid, the concentration of the sulfuric acid in the pickle liquor increases appreciably say to about 40% and the solubility of the ferrous sulfate decreases to less than about 5%, with the result that ferrous sulfate monohydrate precipitates from the liquor. The fortifier provided with a stirrer 14 to agitate the contents, is desirably maintained at between 80 and 120° F. preferably about 100–120° F. The crystal slurry is discharged through line 15 into monohydrate filter 16 wherein ferrous sulfate monohydrate is separated from the liquid and returned through lines 17 and 6 to water extractor 3 for removal of additional water from spent pickle liquor. A portion of the ferrous sulfate monohydrate may if desired be returned via line 18 to pickle liquor fortifier 12. The liquid discharging from monohydrate filter 16 is low in ferrous sulfate content generally less than 5% and high in concentration of $H_2SO_4$ generally in excess of 40%. A concentration commonly used in pickle liquor is about 25–35% $H_2SO_4$ and therefore water flowing through line 19 may be co-mingled with the concentrated liquor flowing through line 21 to produce a regenerated pickle liquor of the desired concentration which is sent through line 22 to storage or plant use. As a result of this operation about 80–90% of the ferrous sulfate content of spent pickle liquor is removed. Substantially all the free sulfuric acid is recovered in useful form and the concentration of sulfuric acid brought to the desired concentration for further use in pickle liquor treatment.

Ferrous sulfate heptahydrate separated in filter 7 is discharged through line 8 and introduced into heptahydrate dehydrator 23 which may be any suitable enclosed pressure reaction vessel equipped with stirrer 24 and jacket 25 through which a heating medium may be passed to keep the contents at a desired temperature. The contents of dehydrator 23 are heated to a temperature in excess of 300° F. and the vessel maintained under superatmospheric pressure of the order of 60–100 p.s.i.g. Under these conditions the ferrous sulfate heptahydrate is converted to ferrous sulfate monohydrate with the release of six molecules of water. The hot crystal slurry is discharged from dehydrator 23 through line 26 into monohydrate filter 27 where the monohydrate is separated from the water of crystallization. Filtration should desirably be conducted under sufficient pressure to maintain the water in liquid form and filtration should be rapidly accomplished preferably in a filter which is either insulated or provided with heating means to prevent substantial heat loss and drop in tempearture. The monohydrate separated in filter 27 is discharged through line 28 and returned via line 17 and line 6 to water extractor 3. Water substantially free of ferrous sulfate is discharged from filter 27 through line 29 and removed from the system through line 31 or if desired a portion of the water is sent via line 32 and line 19 as water for diluting the liquor to the desired concentration.

In the separation of ferrous sulfate monohydrate from the process there is produced as a by-product ferrous sulfate monohydrate which is discharged from the system through line 33 and if desired may be utilized for the manufacture of sulfuric acid by conventional process of roasting the ferrous sulfate to iron oxide and $SO_2$ and converting the $SO_2$ to $SO_3$ and $H_2SO_4$.

The following example illustrates the present invention. Unless otherwise stated all temperatures are in ° F. and all percentages are percentages by weight.

694 lbs. of 190° hot spent pickle liquor, consisting of

| | Percent |
|---|---|
| $H_2SO_4$ | 8.5 |
| $FeSO_4$ | 13.0 |
| $H_2O$ | 78.5 | is passed through a cooler, where it is cooled to 80° and then charged into a jacketed water extractor into which 522 lbs. of ferrous sulfate monohydrate recycled from monohydrate filter, and 694 lbs. of acid filtrate recycled from a heptahydrate filter are added to it. Most of the ferrous sulfate monohydrate remains in solid form suspended in the pickle liquor, and only a small portion is dissolved by it. In the water extractor, the reaction mixture is kept at 80° by cooling with water, and is agitated until the conversion of ferrous sulfate monohydrate to heptahydrate, and thus, the water extraction, has been completed. As the concentration of the sulfuric acid gradually increases to 23% on the water extracting effect of the monohydrate, the solubility of the ferrous sulfate decreases from 19.2% to 12.7% and heptahydrate precipitates out of the pickle liquor in addition to the amount that was formed from the monohydrate.

When the conversion of the ferrous sulfate monohydrate to heptahydrate is completed, the reaction mixture is run to a heptahydrate filter where the acid is separated from the crystals. There, 960 lbs. of ferrous sulfate heptahydrate is recovered, which is 105 lbs. more than corresponds with the quantity of monohydrate added. This amount is equivalent to 58 lbs. of $FeSO_4$, i.e. 64% of the 90 lbs. originally present in the spent pickle liquor. From here, the ferrous sulfate heptahydrate, after being washed acid free, is conveyed to a dehydrator unit. The washwater is kept separately from the acid filtrate and is recycled to the water extractor.

256 lbs. of acid filtrate, consisting of

| | Percent |
|---|---|
| $H_2SO_4$ | 23.0 |
| $FeSO_4$ | 12.7 |
| $H_2O$ | 64.3 | is run to pickle liquor fortifier where 60 lbs. of 98% make-up sulfuric acid is added to it. On addition of the make-up acid, the concentration of the sulfuric acid in the pickle liquor increases to 40.2% and the solubility of ferrous sulfate decreases to about 4%, resulting in the precipitation of ferrous sulfate monohydrate. From here, the crystal slurry is transferred to the monohydrate filter where 24 lbs. of $FeSO_4 \cdot H_2O$ is recovered. This amount of monohydrate is equivalent with 21 lbs. of $FeSO_4$ or 23% of the original ferrous sulfate content of the spent pickle liquor. Thus, 87% of the ferrous sulfate content of the spent pickle liquor has been removed during the regeneration process. 24 lbs. of $FeSO_4 \cdot H_2O$ is recycled to the water extraction step without further treatment.

292 lbs. of acid filtrate, consisting of

| | Percent |
|---|---|
| $H_2SO_4$ | 40.2 |
| $FeSO_4$ | 4.0 |
| $H_2O$ | 55.8 | is the regenerated pickle liquor, which, after dilution to the proper concentration with 178 lbs. of water is

| | Percent |
|---|---|
| $H_2SO_4$ | 25.0 |
| $FeSO_4$ | 2.5 |
| $H_2O$ | 72.5 |

960 lbs. of $FeSO_4 \cdot 7H_2O$ recovered in the heptahydrate filter is transferred to the heptahydrate dehydrator where it is heated to about 310° under a pressure of about 60–80 p.s.i.g. and kept agitated until the conversion of heptahydrate to monohydrate is completed. Then, the hot crystal slurry is transferred to the monohydrate filter where 587 lbs. of monohydrate is separated from the released 6 mols of crystal water. The obtained 373 lbs. of 310° hot water is practically $FeSO_4$-free, and may be utilized for heating purposes. Of the recovered 587 lbs. of $FeSO_4 \cdot H_2O$, 498 lbs. are returned to water extractor together with the 24 lbs. of monohydrate obtained in filter, to furnish the 522 lbs. of salt required in the water extraction step. The remaining 89 lbs. of $FeSO_4 \cdot H_2O$ is withdrawn as a by-product of the process, and may be utilized for the manufacture of sulfuric acid.

Although certain preferred embodiments of the invention have been disclosed for purpose of illustration, it will be evident that various changes and modifications may be made therein without departing from the scope and spirit of the invention.

I claim:

1. A method for regenerating spent pickle liquor comprising an aqueous solution of ferrous sulfate and sulfuric acid by adding a dehydration agent consisting essentially of ferrous sulfate monohydrate to the spent pickle liquor in an amount which is substantially larger than corresponds to its solubility in the spent pickle liquor such that the resultant slurry of solid ferrous sulfate and spent pickle liquor will contain 20–50% by weight ferrous sulfate based on the weight of the slurry, maintaining the temperature of the slurry within the range of from 130° F. to just above the freezing point of the slurry for a sufficient length of time for the ferrous sulfate monohydrate to extract water from the spent pickle liquor and combine with it to form ferrous sulfate heptahydrate and to thus concentrate the sulfuric acid in the pickle liquor with concurrent decrease in solubility of ferrous sulfate in the pickle liquor resulting from increased concentration of the sulfuric acid in the pickle liquor and precipitation of ferrous sulfate heptahydrate from the pickle liquor such that the solid ferrous sulfate heptahydrate in the slurry is greater in quantity based on ferrous sulfate than the amount of ferrous sulfate monohydrate added to the spent pickle liquor, and separating the solid ferrous sulfate heptahydrate from the liquid leaving a liquor containing a more concentrated sulfuric acid solution than initially present in the spent pickle liquor.

2. In the method as recited in claim 1, fortifying said separated liquor by adding concentrated sulfuric acid to the liquor to increase its concentration and to cause precipitation of ferrous sulfate monohydrate therefrom and separating the ferrous sulfate monohydrate precipitate from the fortified liquor.

3. In the method as recited in claim 1, heating the separated ferrous sulfate heptahydrate to a temperature within the range of 212° to 392° F. to convert the ferrous sulfate heptahydrate to ferrous sulfate monohydrate and water while maintaining the ferrous sulfate undergoing conversion under superatmospheric pressure sufficient to keep the released water in liquid form, and separating the ferrous sulfate monohydrate from the released water.

4. A method for regenerating spent pickle liquor comprising an aqueous solution of ferrous sulfate and sulfuric acid by adding a dehydration agent consisting essentially of ferrous sulfate monohydrate to the spent pickle liquor in an amount which is substantially larger than corresponds to its solubility in the spent pickle liquor such that the resultant slurry of solid ferrous sulfate and spent pickle liquor will contain 25–35% by weight ferrous sulfate based on the weight of the slurry, maintaining the temperature of the slurry within the range of from 50–90° F. for a sufficient length of time for the ferrous sulfate monohydrate to extract water from the spent pickle liquor and combine with it to form ferrous sulfate heptahydrate and to thus concentrate the sulfuric acid in the pickle liquor with concurrent decrease in solubility of ferrous sulfate in the pickle liquor resulting from increased concentration of the sulfuric acid in the pickle liquor and precipitation of ferrous sulfate heptahydrate from the pickle liquor such that the solid ferrous sulfate heptahydrate in the slurry is greater in quantity based on ferrous sulfate than the amount of ferrous sulfate monohydrate added to the spent pickle liquor, and separating the solid ferrous sulfate heptahydrate from the liquid leaving a liquor containing a more concentrated sulfuric acid solution than initially present in the spent pickle liquor.

5. In the method as recited in claim 4, fortifying said separated liquor by adding concentrated sulfuric acid to the liquor to increase its concentration and to cause precipitation of ferrous sulfate monohydrate therefrom and separating the ferrous sulfate monohydrate precipitate from the fortified liquor and returning the separated ferrous sulfate monohydrate for extraction of water in spent pickle liquor.

6. In the method as recited in claim 4, heating the separated ferrous sulfate heptahydrate to a temperature within the range of 284° to 338° F. to convert the ferrous sulfate heptahydrate to ferrous sulfate monohydrate and water while maintaining the ferrous sulfate undergoing conversion under superatmospheric pressure sufficient to keep the released water in liquid form, and separating the ferrous sulfate monohydrate from the released water.

7. A method for regenerating spent pickle liquor comprising an aqueous solution of ferrous sulfate and sulfuric acid by adding a dehydration agent consisting essentially of ferrous sulfate monohydrate to the spent pickle liquor in an amount which is substantially larger than corresponds to its solubility in the spent pickle liquor such that the resultant slurry of solid ferrous sulfate and spent pickle liquor will contain 25–35% by weight ferrous sulfate based on the weight of the slurry, maintaining the temperature of the slurry within the range of from 50–90° F. for a sufficient length of time for the ferrous sulfate monohydrate to extract water from the spent pickle liquor and combine with it to form ferrous sulfate heptahydrate and to thus concentrate the sulfuric acid in the pickle liquor with concurrent decrease in solubility of ferrous sulfate in the pickle liquor resulting from increased concentration of the sulfuric acid in the pickle liquor and precipitation of ferrous sulfate heptahydrate from the pickle liquor such that the solid ferrous sulfate heptahydrate in the slurry is greater in quantity based on the ferrous sulfate than the amount of ferrous sulfate monohydrate added to the spent pickle liquor, separating the solid ferrous sulfate heptahydrate from the liquid leaving a liquor containing a more concentrated sulfuric acid solution than initially present in the spent pickle liquor, fortifying said separated liquor by adding concentrated sulfuric acid to the liquor to increase its concentration and to cause precipitation of ferrous sulfate monohydrate therefrom, separating the ferrous sulfate monohydrate precipitate from the fortified liquor and returning the separated ferrous sulfate monohydrate for extraction of water in spent pickle liquor, heating the separated ferrous sulfate heptahydrate to a temperature within the range of 284° to 338° F. to convert the ferrous sulfate heptahydrate to ferrous sulfate monohydrate and water while maintaining the ferrous sulfate undergoing conversion under superatmospheric pressure sufficient to keep the released water in liquid form, separating the ferrous sulfate monohydrate from the released water, and returning the separated ferrous sulfate monohydrate for admixture with additional spent pickle liquor to extract water therefrom.

References Cited

UNITED STATES PATENTS

| | | | |
|---|---|---|---|
| 1,589,610 | 6/1926 | Marsh | 23—305 |
| 2,017,773 | 10/1935 | Smith | 23—126 |
| 2,184,419 | 12/1939 | Fowler | 23—126 |
| 2,185,095 | 12/1939 | Smith | 23—126 |
| 2,322,134 | 6/1943 | Hodge | 23—126 |
| 2,662,812 | 12/1953 | Shaw | 23—126 |
| 3,018,166 | 1/1962 | Powell | 23—126 |

FOREIGN PATENTS

| | | |
|---|---|---|
| 670,085 | 4/1952 | Great Britain. |

NORMAN YUDKOFF, *Primary Examiner.*

G. HINES, *Assistant Examiner.*